Patented Oct. 24, 1933

1,931,962

UNITED STATES PATENT OFFICE

1,931,962

SULPHURIC ACID ESTERS OF ALCOHOLS AND DERIVATIVES THEREOF

Karl Marx, Karl Brodersen, and Matthias Quaedvlieg, Dessau in Anhalt, Germany, assignors, by mesne assignments, to I. G. Farbenindustrie A. G., Frankfort-on-the-Main, Germany, a corporation of Germany No Drawing. Application August 17, 1931, Serial No. 557,734, and in Germany August 21, 1930. Renewed July 15, 1933

14 Claims. (Cl. 260—98)

Our present invention relates to a new process for manufacturing sulphuric acid esters of alcohols and the derivatives thereof.

The products obtainable according to this invention correspond to the general formula $$R\text{---}O\text{---}SO_3X,$$

wherein R means an alkyl or aralkyl radical containing at least 10 carbon atoms and X stands for H or a salt forming inorganic or organic compound, such as alkali metal, ammonium, or the group $H\cdot NH_2 Y$, Y meaning phenyl, tolyl, naphthyl, $CONH_2$,

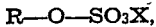

and similar radicals.

We have found that alcoholic compounds having in their molecule more than 10 carbon atoms, are easily transformed into the corresponding sulphuric acid esters by acting upon them with aminosulphonic acid or the derivatives thereof. The formation of sulphuric acid esters occurs with these agents in a very smooth manner and the esters are obtainable in a very good yield and in a sufficiently pure state.

As alcoholic substances with more than 10 carbon atoms which may be used as starting materials we enumerate the following:—the higher aliphatic alcohols such as, for instance, dodecyl alcohol, hexadecyl alcohol, octadecyl alcohol, polyvalent alcohols with more than 10 carbon atoms, fatty alcohols containing a phenyl group or a cyclohexyl group, alcohols corresponding to the general formula $R\text{---}CO\text{---}NHR'\text{---}OH$ (R meaning a higher aliphatic radical and R' an aliphatic radical) such as lauroyl-hydrxyethylamide, the hydroxyethyl- or propyl amide of coconut oil acid, stearoylhydroxypropyl amide, monocarboxylic acids esters of the higher fatty acids, such as esters of coconut oil acid, oleic acid, stearic acid, palmitic acid with polyvalent alcohols such as glycerin, sorbit and polyglycerin, and mono-ethers of polyvalent alcohols, such as stearyl-glycerin ether, palmitylglycerin ether.

For preparing the sulphuric acid esters of the said compounds, the compound may be reacted with the free aminosulphonic acid. In this case the reaction occurs according to the following equation:

$$R\text{---}OH + NH_2SO_3H = ROSO_3NH_4.$$

As compared with the usual method of preparing sulphuric acid esters, the process according to our present invention involves the advantage that the neutral ammonium salt of the sulphuric acid ester is produced directly and that a further treatment is no longer necessary.

The aminosulphonic acid may be employed, either partially or wholly in form of a salt, especially with an organic base, such as pyridine. The amount of the base present in the esterifying mixture, may vary within wide limits. Thus, an excess of base may, for instance, be used as a solvent; it is, however, advantageous to use only very small quantities of the base, which are already sufficient to accelerate the reaction.

Instead of the aminosulphonic acid there may likewise be used organic sulphamic acids, such as $HO_3S\text{---}NH\text{---}CO\text{---}NH_2$, phenyl and tolyl sulphamic acid and the salts thereof, for instance, of the alkalies, of ammonium or of organic bases. In this manner, salts are obtained of the sulphuric acid ester and the bases from which the sulphamic acids are derived. The reaction probably occurs according to the following equation:

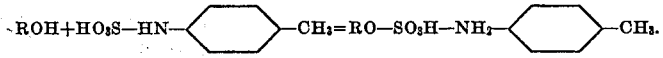

It is furthermore possible to prepare sulphuric acid esters of primary, secondary and tertiary alcohols of the kind described by heating them with salts of the iminodisulphonic acid, if required in the presence of a solvent, for instance, pyridine. In this case also excess of the sulphonating agent and a laborious after-treatment are unnecessary. The iminodisulphonic acid is more easily accessible than the aminosulphonic acid. In this case, the reaction probably may be represented by the equation:

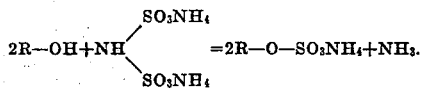

The following examples illustrate the invention:

*Example 1.*—150 parts of stearyl alcohol are heated to 110° C.–120° C. for 20 hours, while stirring, with 60 parts of aminosulphonic acid. There are obtained 210 parts of the ammonium salt of the acid octadecyl sulphuric acid ester in the form of a neutral, nearly colorless powder which dissolves in water to a clear and strongly foaming solution. The reaction probably occurs according to the equation $$CH_3-(CH_2)_{16}-CH_2OH+NH_2SO_3H= CH_3-(CH_2)_{16}-CH_2O-SO_3-NH_4.$$

*Example 2.*—100 parts of an alcohol mixture (having the average molecular weight 175) obtained by the oxidation of paraffin are heated for 4 hours to 100° C.–110° C., while well stirring, with 56 parts of aminosulphonic acid. The product obtained is a mass of the nature of an ointment which dissolves in water to a clear solution.

*Example 3.*—270 parts of stearyl alcohol are stirred at 110° C. for some hours with 180 parts of 4-methylphenylsulphamic acid. There are obtained 450 parts of a product which dissolves in water to a clear solution and solidifies in the cold to a waxlike mass.

*Example 4.*—270 parts of stearyl alcohol are mixed at 100° C., while stirring, with 350 parts of benzamide-N-sulphonate of benzamide. The temperature is kept for about ½ hour at 100° C.–110° C. The reaction probably takes place according to the following equation:

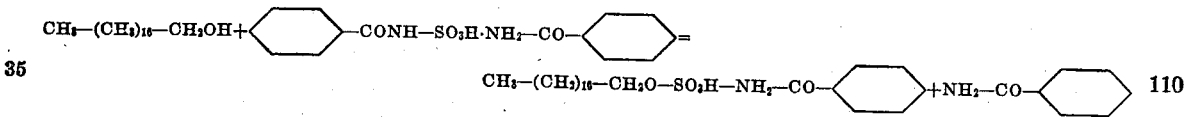

Since the benzamide salt obtained is hydrolyzed in the presence of water, the clear melt is dissolved in 3500 parts of hot water and the solution is mixed with a sodium hydroxide solution until the reaction is weakly alkaline. The whole is then cooled to 40° C. and the benzamide is eliminated by filtration. The filtrate is then evaporated.

*Example 5.*—270 parts of stearyl alcohol are stirred for some hours at 110° C. with 200 parts of the ammonium salt of paratoluidinesulphamic acid. The reaction probably occurs according to the following equation:

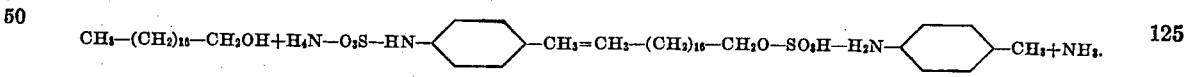

About 460 parts of a product are obtained which is soluble in water and solidifies in the cold to a waxlike mass.

*Example 6.*—150 parts of stearyl alcohol are heated to 110° C.–120° C., while stirring, with 60 parts of aminosulphonic acid and 5 parts of pyridine. The reaction is already complete after one hour, whereas in the absence of the pyridine salt of the aminosulphonic acid heating for twenty hours would be necessary. A like result is attained, if instead of pyridine corresponding quantities of ethylolamine, dipropylolamine, triethylolamine, diethylaniline or other bases were used.

*Example 7.*—15 parts of lauroyl-hydroxyethylamide, 75 parts of pyridine and 9 parts of aminosuphonic acid are heated, while stirring, for 3 hours to 80° C.–100° C. The pyridine in excess is then removed, for instance, by distillation. The sulphuric acid ester of the lauroyl hydroxyethylamide is obtained which could hitherto not be obtained in a pure form, since during sulphonating with sulphuric acid the lauroyl group is displaced to the hydroxyl group (cf. "Zeitschrift für physiologische Chemie", vol. 146, pages 227–240). The reaction probably occurs according to the following equation:

$$C_{11}H_{23}-CO-HNCH_2-CH_2OH+H_2NSO_3H+ C_5H_5N=C_{11}H_{23}-CO-HNCH_2- CH_2OSO_3H-C_5H_5N+NH_3.$$

In an analogous manner, the glycolmonocetyl ether can easily be converted into its surphuric acid ester. The pyridinium salt formed may be converted into the sodium salt by addition of caustic soda.

*Example 8.*—40 parts of coconut fatty acid hydroxyethyl amide are heated in a reflux apparatus for 2 to 3 hours, while stirring, with 32 parts of aminosulphonic acid and 30 parts of 1.2-dichlorethane. Instead of 1.2-dichlorethane other solvents may also be used, for instance, carbon tetrachloride, trichlorethylene, benzene or the like. After the reaction is complete, 50 parts of water are added and then the quantity of a concentrated caustic soda solution which is required for the conversion of the product into the sodium salt. The solvent and the ammonia evolved are removed simultaneously by distillation. The sodium salt of the sulphuric acid ester of the coconut fatty acid-hydroxyethylamide remains in the form of a white paste having the consistency of soft soap. It is an excellent emulsifying agent and a detergent of good qualities even in hard or acid water.

*Example 9.*—100 parts of lauroyl-hydroxyethylamide are stirred for 4 hours with 45 parts of amino sulphonic acid at a temperature of about 85° C. The ammonium salt of the acid sulphonic acid ester thus obtained, is converted into the sodium salt by addition of caustic soda. This product has outstanding good qualities as a softening agent for fabrics, artificial silk and so on.

*Example 10.*—28 parts of phenylbutanol, 55 parts of the ammonium salt of the iminodisulphonic acid of the following constitution:

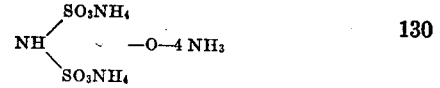

and 200 parts of pyridine are heated to boiling for about 8 hours in a reflux apparatus. After distilling the pyridine in excess under reduced pressure, a salt of the phenyl-butylsulphuric acid remains. Instead of the ammonium salt other salts, for instance those of the alkalies or of organic bases, can be used with the same result.

*Example 11.*—40 parts of a mixture of primary, secondary and tertiary alcohols (average molecular weight 195) obtained by oxidizing paraffin, 55 parts of the ammonium salt of iminodisulphonic acid of the following constitution:

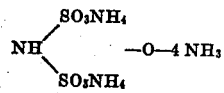

and 200 parts of pyridine are heated to boiling, while stirring, for 8 hours in a reflux apparatus. The product is worked up as indicated in Example 10. The ammonium salts of the corresponding sulphuric acid esters are thus obtained in the form of a semi-solid and water-soluble mass.

*Example 12.*—24 parts of cetyl alcohol, 27 parts of ammonium iminodisulphonate of the following constitution:

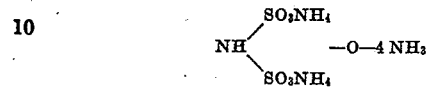

and 100 parts of pyridine are heated to boiling, while stirring, for 10 hours in a reflux apparatus. The mass obtained is worked up as indicated in Example 10. There is obtained the ammonium salt of the cetylsulphuric acid. The cetyl alcohol can also be replaced by equivalent quantities of a cetyl alcohol substituted, for instance, by Cl or $OC_6H_5$.

What we claim is:—

1. The process which comprises acting upon a compound having an aliphatic alcoholic group and at least 10 carbon atoms with a sulphonating agent of the group consisting of amino sulphonic acid, aminosulphonates, organic sulphamic acids, alkali metal-, ammonium salts and salts of organic bases of organic sulphamic acids, and iminodisulphonic acid salts.

2. The process which comprises acting upon a compound having an aliphatic alcoholic group and at least 10 carbon atoms with a sulphonating agent of the group consisting of amino sulphonic acid, amino-sulphonates, organic sulphamic acids, alkali metal-, ammonium salts and salts of organic bases of organic sulphamic acids and iminodisulphonic acid salts in the presence of a nitrogenous organic base.

3. The process which comprises acting upon a compound having an aliphatic alcoholic group and at least 10 carbon atoms with amino sulphonic acid in the presence of a nitrogenous organic base and converting the ammonium salt formed into the corresponding sodium salt by addition of caustic soda.

4. The process which comprises acting upon a higher fatty acid hydroxy alkyl amide with a sulphonating agent of the group consisting of aminosulphonic acid, aminosulphonates, organic sulphamic acids, alkali metal-, ammonium salts, and salts of organic bases of organic sulphamic acids, and iminodisulphonic acid salts.

5. The process which comprises acting upon a higher fatty acid hydroxyalkyl amide with a sulphonating agent of the group consisting of aminosulphonic acid, aminosulphonates, organic sulphamic acids, alkali metal-, ammonium salts and salts of organic bases of organic sulphamic acids, and iminodisulphonic acid salts in the presence of an organic solvent.

6. The process which comprises acting upon a higher fatty acid hydroxyalkyl amide with a sulphonating agent of the group consisting of aminosulphonic acid, aminosulphonates, organic sulphamic acid, alkali metal-, ammonium salts, and salts of organic bases of organic sulphamic acids and iminodisulphonic acid salts in the presence of a nitrogenous organic base.

7. The process which comprises acting upon lauroyl hydroxyethyl amide with aminosulphonic acid at a temperature of about 85° C.

8. The process which comprises acting upon lauroyl hydroxyethyl amide with aminosulphonic acid at a temperature of about 80-100° C. in the presence of pyridine.

9. The process which comprises acting upon lauroyl hydroxyethyl amide with aminosulphonic acid at a temperature of about 85° C. and converting the ammonium salt formed into the corresponding sodium salt by addition of caustic soda.

10. The process which comprises acting upon coconut oil acid hydroxyethyl amide in the heat with aminosulphonic acid in the presence of an organic solvent.

11. As new products the compounds corresponding to the general formula $$R-CONH-R'OSO_3X$$

wherein R means the radical of an aliphatic hydrocarbon containing at least 10 carbon atoms, R' means an alkylene radical, and X stands for an alkali metal, ammonium or H bound to a nitrogenous organic base, said products being soap-like substances soluble in water, having good emulsifying and washing properties and being softening agents for fabrics and artificial silk.

12. As new products the compounds corresponding to the general formula $$C_{11}H_{23}-CONH-CH_2CH_2OSO_3X,$$

wherein X means an alkali metal or ammonium, said products being soap-like substances soluble in water, having good emulsifying and washing properties and being softening agents for fabrics and artificial silk.

13. As new products the compounds corresponding to the general formula $$R-CONH-R'OSO_3X$$

wherein R—CO means the radicals of the fatty acids contained in coconut oil, R' means an alkylene radical and X stands for an alkali metal, ammonium or H bound to a nitrogenous organic base, said products being soap-like substances soluble in water, having good emulsifying and washing properties and being softening agents for fabrics and artificial silk.

14. As new products the compounds corresponding to the general formula $$C_{11}H_{23}-CONH-R'OSO_3X$$

wherein R' means an alkylene radical and X stands for an alkali metal, ammonium or H bound to a nitrogenous organic base, said products being soap-like substances soluble in water, having good emulsifying and washing properties and being softening agents for fabrics and artificial silk.

KARL MARX.
KARL BRODERSEN.
MATTHIAS QUAEDVLIEG.